Oct. 14, 1958 R. E. GRIMM 2,856,562
PHOTOGRAPHIC FLASH UNIT
Filed Jan. 14, 1957 2 Sheets-Sheet 1
FIG. 1
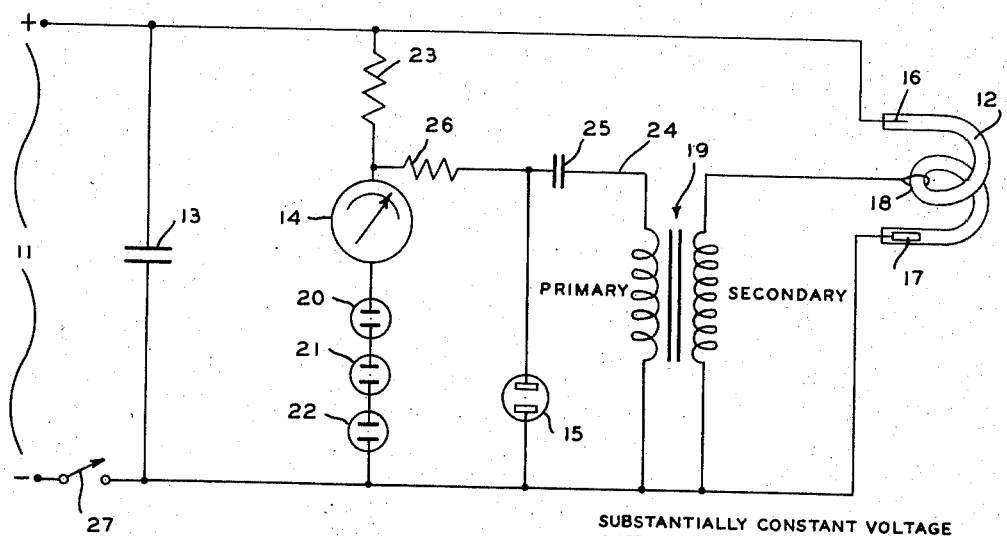
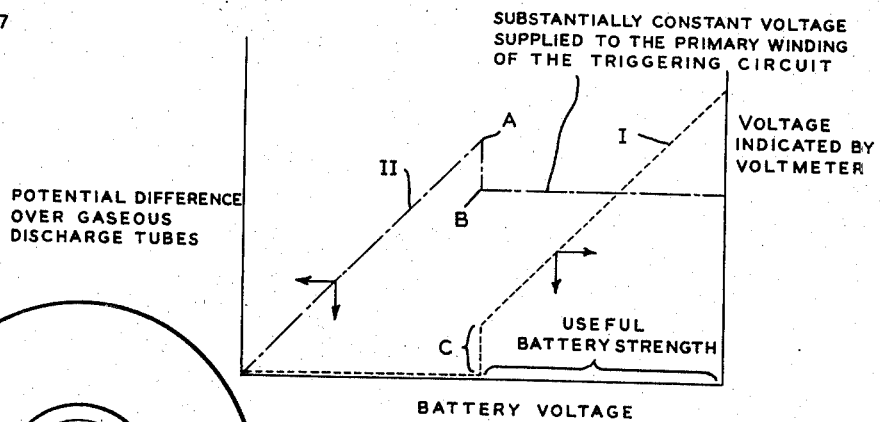
FIG. 2
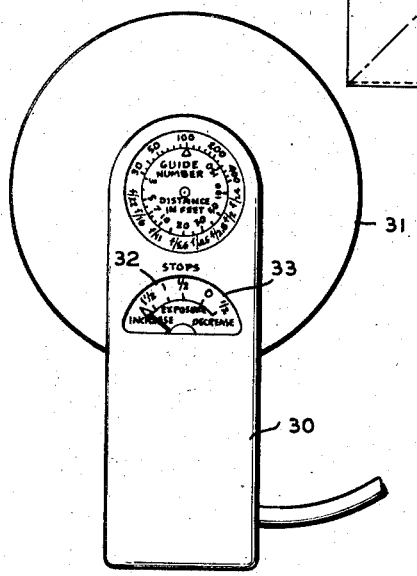
FIG. 3
INVENTOR
RALPH E. GRIMM
BY
ATTORNEY Oct. 14, 1958

R. E. GRIMM 2,856,562

PHOTOGRAPHIC FLASH UNIT

Filed Jan. 14, 1957

INVENTOR
RALPH E. GRIMM
BY
ATTORNEY

United States Patent Office 2,856,562
Patented Oct. 14, 1958

2,856,562

PHOTOGRAPHIC FLASH UNIT

Ralph E. Grimm, Washington, D. C., assignor, by mesne assignments, to Vitro Corporation of America, New York, N. Y., a corporation of Delaware Application January 14, 1957, Serial No. 633,944

10 Claims. (Cl. 315—135)

The present invention relates to dry battery operated electronic photoflash equipment and more particularly to the provision of an electronic circuit which provides a stabilized triggering voltage together with an adequate metering of the voltage across the storage condenser, so that the light output of the photoflash equipment may be estimated and the exposure of the camera associated with the photoflash equipment accurately regulated to produce a proper exposure under lighting conditions which will be encountered when the flash lamp or tube is actuated.

As is well known, the light output of an electronic photoflash unit is in proportion to the strength of the batteries forming a part of said unit. More specifically, exposure varies approximately as the square of the voltage across the condenser which serves as a storage means for the voltage which triggers the flash. Accordingly, as the energy of the battery is depleted through use, the photoflash unit delivers a constantly decreasing amount of light output.

In accordance with the present invention, an electronic circuit is provided to produce a constant triggering voltage and this circuit includes a meter to indicate in a usable form the condition of the dry batteries serving as a source of power for the photoflash unit so that the photographer may compensate by camera for weak batteries.

At the present time, photographers either guess as to the strength of the batteries in the flash unit or, to be safe, replace old batteries with fresh ones after a number of flashes have been made and before the batteries have been sufficiently exhausted to preclude effective utilization thereof.

It is to be particularly observed that the constant monitoring of the voltage across the storage condenser by means of a voltmeter does not provide a satisfactory solution to the problem of invention. This is because a voltmeter having a linear scale would have all of the information crowded into the upper end of the scale and it would be very difficult to read the required information with any satisfactory degree of accuracy. While there are known means of expanding the scale of the instrument by shaping the pole pieces in such a manner as to provide a varying amount of flux at different angular positions of the meter, such a construction would materially increase the cost of the indicating meter, and the meter movement would require more current from the circuit than is the case with the present invention.

Moreover, the utilization of suitable pole pieces provides a more complicated mechanism which is less reliable and more susceptible to electrical and mechanical failure.

It has been the custom in the past to derive the triggering voltage for electronic flash tubes from a resistive voltage divider across the high voltage source or to derive it from a tap on the high-voltage dry battery in such a manner that the cells supplying the triggering circuit are also a portion of the battery supplying the high voltage. As a result, the triggering voltage drops off at the same or a greater rate than the whole battery. Both of these arrangements commonly used in the past are undesirable since as the voltage across an electronic flash tube is lowered it becomes more and more difficult to ionize the tube. Instead of the ionization voltage from the trigger transformer dropping off, as is the case with all present designs, it should either stay constant or increase as the voltage across the anode and cathode of the electronic flash tube is reduced.

Most preferably and in accordance with the invention, the ionization voltage from the trigger transformer remains substantially constant so that the flash tube may be effectively ionized and, at the same time, the flashing of the tube will produce a definite quantity of light depending upon the voltage across the storage condenser (the voltage supplied to the terminal electrodes of the flash tube) so that the light emitted can be accurately predicted and the correct exposure utilized.

It is accordingly the purpose of the present invention to provide a circuit overcoming the deficiencies in present-day designs, said deficiencies being referred to above, by the provision of an electronic circuit which stabilizes the triggering voltage and provides adequate metering of the voltage across the storage condenser in a form permitting the photographer to make suitable adjustments for the condition of the battery as by suitable regulation of the lens opening. In this manner, reliable photographic exposures can be achieved and the battery may be used with confidence until the strength thereof has been sufficiently exhausted to prevent further utilization thereof.

The invention will now be described in conjunction with the accompanying drawings in which:

Fig. 1 is a schematic view showing an electronic circuit including a flash tube or lamp, a variable voltage source, and a meter;

Fig. 2 is a dual graph schematically correlating battery voltage with the potential over the discharge tubes, on the one hand, and the potential indicated by the voltmeter, on the other hand;

Fig. 3 is a rear elevation of a photoflash unit including the housing, the reflector and the meter.

Fig. 1 illustrates the manner in which the present invention operates to provide a stabilized flashing voltage and a realistic and readily utilizable indication of the voltage which is available to the terminal electrodes of the flash lamp.

Figure 4:
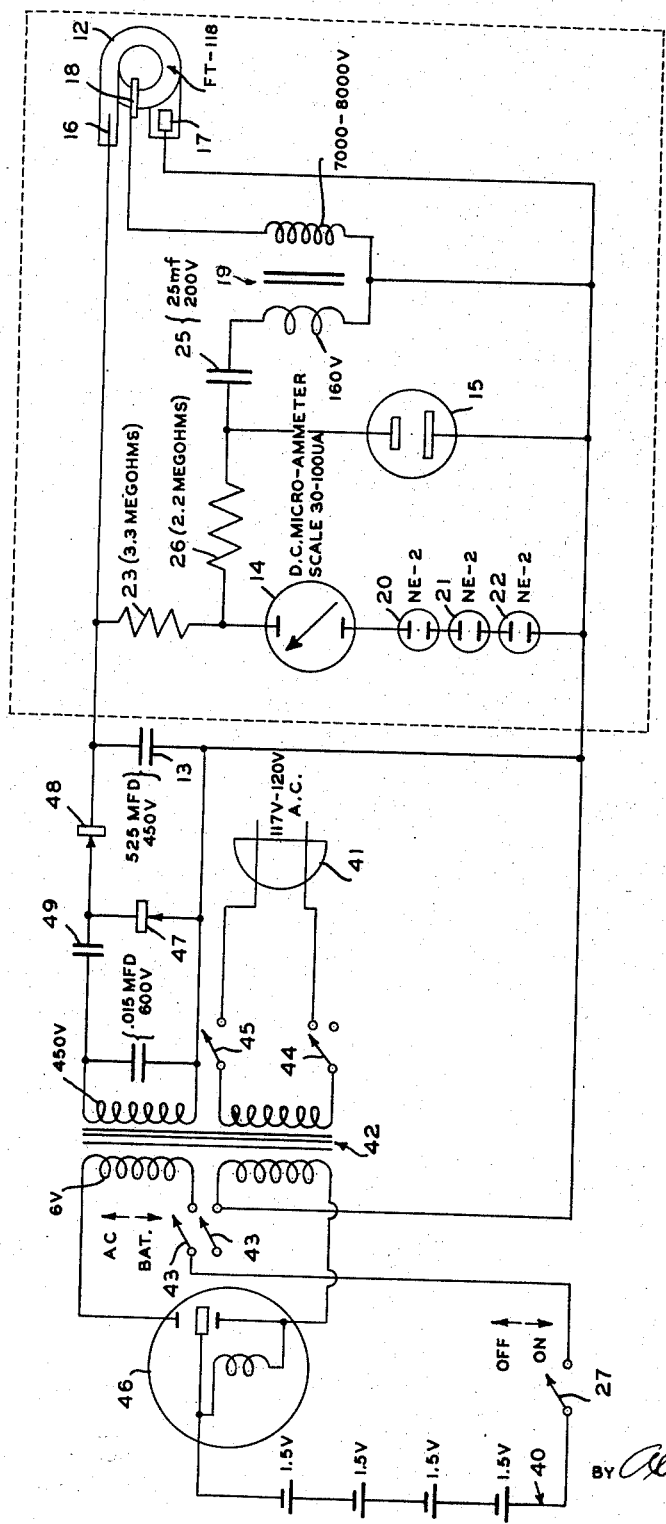
Fig. 4 shows an illustrative embodiment of the invention with the components of the circuit specifically identified.

Referring more particularly to Fig. 1, the numeral 10 generically designates an electronic circuit provided with a variable voltage current supply 11 (a dry cell battery), a flash lamp 12, a storage condenser 13 and a meter 14. The circuit also includes a connector 15 to which a synchronizer cable (not shown) is attached for the purpose of connecting the flash unit to the shutter contacts of the camera.

The synchronization of the flash unit with the camera is conventional, and forms no part of the invention and hence will not be discussed.

The flash lamp 12 is of the ionization type and is provided with terminal electrodes 15 and 17 and a control electrode or grid 18 which is connected to the secondary of a transformer 19.

The meter 14 is in parallel with the storage condenser 13 and the flash lamp 12. There is also provided in series with the meter 14 and in parallel with the flash lamp 12 and the storage condenser 13, at least one and preferably a plurality of ionizing tubes, e. g. neon tubes 20, 21 and 22 and a resistance 23. Voltmeter 14 is preferably constituted by direct current reading micro-ammeter 14 in series with resistance 23. When the term "voltmeter" is employed herein, it signifies the combination of the micro-ammeter 14 and the resistance.

Between the resistance 23 on the one hand, and the ionizing tubes 20, 21 and 22, on the other hand, is a line 24 containing a condenser 25 and preferably also a resistance 26. The line 24 is connected to the primary of the transformer 19.

When the shutter contacts of the camera close, current flows across the connector 15, and assuming that the tubes 20, 21 and 22 are ionized to permit the condenser 25 to become charged, then the condenser 25 discharges through the primary of the transformer 19 and the rapidly collapsing magnetic field induces a voltage in the secondary of the transformer 19 (the trigger transformer) and the flash tube or lamp 12 is ionized and actuated.

A switch 27 is normally provided in the circuit 10 so that the circuit may be connected and disconnected when desired.

The operation of the schematic circuit shown in Fig. 1 will now be described in conjunction with the graphical representation shown in Fig. 2.

Prior to the closing of the shutter contacts of connector 15, the power source 11 (dry cell battery) charges the condenser 13 to an extent depending upon the strength of the source. This charge is transmitted to the terminal electrodes 16 and 17 of the flash lamp 12. Since the flash lamp 12 must be ionized in order to flash, the lamp does not fire at this time.

If the voltage of the power source is sufficient to ionize the gaseous discharge tubes 20, 21 and 22, the current flow through these tubes and current is drawn through resistors 23 and 26. This causes the meter 14 to register and the condenser 25 to become charged. The gaseous discharge tubes 20, 21 and 22 have the well-known characteristic that the voltage drop across them remains constant regardless of the current flow through them. As a result, the trigger condenser 25 is charged to a voltage lower than the voltage of the source 11 which is determined by the total resistance of the resistance 23 and the tubes 20, 21 and 22. Because of the above-described nature of the tubes 20, 21 and 22, these tubes limit the current passing through them even though the potential applied to these tubes tends to increase. As a result thereof, a substantially uniform voltage will be applied to the trigger condenser 25 irrespective of the voltage of the source 11.

Referring to the graph in Fig. 2, and particularly to curve II thereof, it will be seen that as the potential applied from the battery is built up, the potential value at point A is reached, at which point all the tubes, 20, 21, and 22 ionize. When all of the tubes are ionized, current flows through resistance 23 and through resistance 26. The voltage drops to a relatively constant point B as is shown in the graph in Fig. 2. Said constant voltage B is that which is applied across shutter contacts 15. Said constant voltage B is likewise that which is applied across the plates of trigger condenser 25.

Upon closing shutter contacts 15, constant voltage B applied to the trigger condenser is discharged through the primary winding of transformer 19. The electromotive force generated in the secondary of said transformer causes the flash tube to flash.

Curve I shows the voltage indicated by meter 14, which is the difference between the voltage at the storage condenser 13 and the trigger condenser 25. (Voltage B). In this way, a relatively constant voltage exists across condenser 25. The discharge of this condenser 25 into the primary of transformer 19 thereby provides a uniform triggering voltage.

At the same time, an expanded scale indication of the voltage in the storage condenser 13 is obtained and this can be shown on the meter in voltage, relative voltage, or preferably as a direction to increase or decrease the normal exposure. Since no current flows through the meter 14 until the tubes 20, 21 and 22 are ionized, this provides an effective scale expansion for the conventional and simple linear voltmeter 14. If desired, the voltmeter can have its hairspring adjusted to provide a suppressed zero to further expand the scale thereof as will be explained hereinafter.

When the shutter contacts of connector 15 are closed, condenser 25 discharges into the primary of transformer 19 and induces a voltage in the secondary to provide a sufficiently high voltage for the ionizing electrode or grid 18 to ionize the flash tube.

When the shutter contacts open, the above operation repeats itself and the meter 14 again draws an amount of current determined by the voltage of the power source and the total resistance of the resistance 23, the resistance 26, and the discharge tubes 20, 21 and 22.

It will be seen in Fig. 2 that the portion of curve I identified by the letter C is useless as an indication of battery strength and therefore, the effective scale of the linear voltmeter may be further expanded by adjusting the hairspring thereof so that only voltages in excess of the maximum voltage in portion C of curve I will register on the voltmeter.

Fig. 3 illustrates a flash unit construction in accordance with the invention. More particularly, the flash unit comprises a housing 30 having a reflector 31 mounted thereon. The reflector may be detachably secured or fixed if desired. As is conventional, a flash tube is mounted at the focus of the reflector where it is connected to the terminals 16, 17 and 18 of the circuit which is carried within the housing 30.

The voltmeter 14 is mounted within the housing 30 and the scale 32 of the voltmeter is positioned to be visible through an opening 33 at the rear of the housing. An exposure guide calculating device 34 may also be secured to the rear of the housing 30. Accordingly, the ordinary exposure which assumes that the flash lamp will be flashed with a substantially fresh battery may be modified by the knowledge gained from the circuit of the invention which provides a substantially uniform triggering voltage together with a clear indication of what the battery strength is.

To specifically illustrate the invention, reference is had to Fig. 4 which shows a preferred circuit in briefed form in accordance with the invention and identifies the components thereof and the specification of the components with particularity. The portion of the circuit contained within the dotted lines is housed in the housing 30 of the flash head. As will be seen, the preferred construction employs an arrangement in which batteries or an A. C. current source may be used interchangeably depending on the availability of the latter.

The numbers employed in Fig. 4 which correspond with those used in Fig. 1 indicate corresponding parts. Additionally, the batteries are indicated by the numeral 40 and there is a plug 41 for connection to ordinary house current. There is further a transformer 42 for suitably adjusting the voltage of the batteries 40 with house current depending upon which is selected. This selection is made by means of switches 43, 44 and 45, the switches 43 and 44 being ganged together for simultaneous operation and the switches 27 and 45 being also ganged together for simultaneous operation. The numeral 46 designates a vibrator for converting the D. C. current source to intermittent direct current to feed the transformer 42 at the primary windings thereof.

The transformer 42 is wound to provide a turns ratio suitable for stepping up a current of 6 volts in the primary to a voltage sufficiently high to charge the condenser 13 to its rated value of 450 volts. In the preferred circuit shown in Fig. 4, rectifiers 47 and 48 are employed in combination with a condenser 49 to provide a voltage doubling function which permits a smaller number of turns in the secondary of the transformer 42. The meter 14 is a direct current micro-ammeter having a scale reading from 30 to 100 microamperes. A suitable type of micro-ammeter is available from the Weston Manufacturing Co. It is preferred to employ a meter having dimensions of approximately 2½ inches in diameter for the purpose of providing a scale which is easy to read.

Alternatively, it is possible to employ line alternating current voltage as is shown in Fig. 4 by plugging in plug 41 into a 120 volt line (110–120 volts). Upon closing switches 44 and 45, step-down transformer portion of the transformer 42 supplies through the secondary of the transformer an intermittent voltage of about 6 volts to the vibrator 46. The vibrator 46 supplies rectified intermittent D. C. current through the primary of the power supply portion of the transformer 42 and serves to supply a voltage of about 450 volts at the output of said transformer, said voltage being that which is applied at storage condenser 13.

The general arrangement of the components in the flashing circuit have already been described. The neon tubes 20, 21 and 22 are standard tubes which may be purchased from lamp manufacturers such as the General Electric Company, under the designation Standard NE-2 and have a normal operating voltage of about 55 volts and a maximum operating voltage of about 90 volts.

The flash lamp is preferably a Xenon-filled electronic flash tube which illustratively has an operating voltage of 450 volts and a manufacturer's rating light output of 4,400 Lumen seconds at the maximum of 100 watt seconds rating. The designation of this flash tube is FT-118 and it may be purchased from the General Electric Company.

The ignition transformer 19 is of the same general construction as those which are used in ignition systems for small model airplanes and the like. The inductance of transformer 19 is, however, modified in the respect that it is higher than that which is usually employed for trigger transformers in model airplanes. The increased value of inductance serves to lengthen the duration of the secondary voltage generated at the transformer and the amount of current which passes through shutter contacts 15 is thereby lessened to prevent undue damage of the shutter contacts. In this way, a longer service life of the shutter contacts is assured.

The initial charge on the primary of transformer 19, which is the same charge as on condenser 25, is about 160 volts. The transformer 19 steps up this voltage to a value of at least 7,000 to 8,000 volts. This voltage from the secondary is that which flashes the electronic flash tube.

I claim:

1. In a photoflash unit having a variable voltage source, the improvement comprising an electronic circuit for supplying voltage to a triggering transformer for flashing said unit, said electronic circuit including a flash lamp, a storage condenser supplied with said variable voltage source which attains the voltage of said source, a direct current indicating meter, and a resistance in series with said meter, said meter and resistor being in parallel with said storage condenser and at least one ionizing tube in series with said meter to supply a substantially uniform voltage to said triggering transformer.

2. The improvement set forth in claim 1 in which a plurality of ionizing tubes are provided in series with said meter.

3. In a photoflash unit having a variable voltage source, the improvement comprising an electronic circuit including a flash lamp, a storage condenser in parallel with and supplied by said variable voltage source to attain the voltage of said source, a plurality of ionizing tubes and a resistance in series with said ionizing tubes and in parallel with said flash lamp and said storage condenser, a triggering transformer for said flash lamp which is supplied substantially uniform voltage from said ionizing tubes, shutter contact means in parallel with said ionizing tubes and in series with the primary of said transformer to energize said transformer and flash said lamp.

4. In a photoflash unit having a variable voltage source, the improvement comprising an electronic circuit including a flash lamp, a storage condenser in parallel with and supplied by said variable voltage source, a direct current indicating meter arranged in parallel with said storage condenser and said flash lamp, a plurality of ionizing tubes and a resistance in series with said meter and in parallel with said flash lamp and said storage condenser, a triggering transformer for said flash lamp which is supplied substantially uniform voltage from said ionizing tubes, shutter contact means in parallel with said ionizing tubes and in series with the primary of said transformer to energize said transformer and flash said lamp.

5. In a battery powered photoflash unit, the improvement comprising an electronic circuit including a flash lamp, a storage condenser in parallel with said battery and said flash lamp, said condenser attaining the available voltage from said battery, a linear direct current indicating meter arranged in parallel with said storage condenser and said flash lamp and a triggering circuit for ionizing said flash lamp, said triggering circuit comprising a condenser, a transformer, at least one ionizing tube and a resistance, said ionizing tube and said resistance being arranged in series with said meter, said ionizing tube supplying a substantially uniform voltage to said transformer in said triggering circuit.

6. The improvement recited in claim 5, in which said condenser of said triggering circuit is connected through an intervening resistance between said ionizing tube and said resistance of said triggering circuit.

7. In a battery powered photoflash unit comprising a flash lamp, a condenser supplied by the battery of said unit to attain the voltage delivered therefrom, a triggering transformer having a condenser in series therewith and in which said flash lamp is fired by an ionizing voltage produced by discharging the condenser in series with said transformer, the improvement comprising arranging a linear direct current indicating meter, a resistance connected thereto, a triggering condenser in series with said resistance and at least one ionizing tube in parallel with said storage condenser and in series with said transformer said ionizing tube supplying a substantially uniform voltage to said triggering transformer.

8. A photoflash unit including a housing, a reflector mounted on said housing, said housing containing therewithin at least a portion of an electronic circuit which includes a triggering transformer for triggering said flash lamp, terminals adapted for connection to a flash lamp including an ionizing terminal and means for supplying a relatively constant value ionizing potential to said triggering transformer and a linear direct current reading meter in series with a resistance transformer.

9. A photoflash unit as recited in claim 8 in which at least one ionizing tube is connected in series with said meter.

10. A photoflash unit as recited in claim 8 in which a triggering condenser is connected in series between said meter and said transformer.

References Cited in the file of this patent

UNITED STATES PATENTS

| | | |
|---|---|---|
| 1,744,840 | Strieby et al. | Jan. 28, 1930 |
| 1,921,499 | Bishop | Aug. 8, 1933 |
| 2,469,913 | Basham | May 10, 1949 |
| 2,495,301 | Wengel | Jan. 24, 1950 |
| 2,516,209 | Henninger | July 25, 1950 |
| 2,721,959 | Nessel | Oct. 25, 1955 |
| 2,738,443 | Danziger | Mar. 13, 1956 |
| 2,775,718 | Dublier | Dec. 25, 1956 |

FOREIGN PATENTS

| | | |
|---|---|---|
| 998,286 | France | Sept. 1951 |
| 750,224 | Great Britain | June 13, 1953 |

UNITED STATES PATENT OFFICE
CERTIFICATE OF CORRECTION

Patent No. 2,856,562                                            October 14, 1958

Ralph E. Grimm

It is hereby certified that error appears in the printed specification of the above numbered patent requiring correction and that the said Letters Patent should read as corrected below.

Column 5, line 73, and column 6, line 12, before "which", each occurrence, insert -- to --; same column 6, line 75, list of references cited, under the heading "FOREIGN PATENTS", for "June 13, 1953" read -- June 13, 1956 --.

Signed and sealed this 6th day of January 1959.

(SEAL)
Attest:

KARL H. AXLINE
Attesting Officer

ROBERT C. WATSON
Commissioner of Patents